US007812296B2

(12) United States Patent
Hayashi

(10) Patent No.: US 7,812,296 B2
(45) Date of Patent: Oct. 12, 2010

(54) IMAGING APPARATUS AND METHOD FOR GENERATING AN ABERRATION FREE IMAGE

(75) Inventor: Yusuke Hayashi, Tokyo (JP)

(73) Assignee: Kyocera Corporation, Kyoto (JP)

( * ) Notice: Subject to any disclaimer, the term of this patent is extended or adjusted under 35 U.S.C. 154(b) by 469 days.

(21) Appl. No.: 11/910,225

(22) PCT Filed: Mar. 29, 2006

(86) PCT No.: PCT/JP2006/306478

§ 371 (c)(1),
(2), (4) Date: Sep. 28, 2007

(87) PCT Pub. No.: WO2006/106737

PCT Pub. Date: Oct. 12, 2006

(65) Prior Publication Data

US 2009/0251588 A1    Oct. 8, 2009

(30) Foreign Application Priority Data

Mar. 30, 2005    (JP) .............................. 2005-100128
Jul. 27, 2005    (JP) .............................. 2005-217804

(51) Int. Cl.
*G01J 1/20*    (2006.01)
*G06K 9/40*    (2006.01)

(52) U.S. Cl. .................................. 250/201.9; 382/255
(58) Field of Classification Search .............. 250/201.9; 359/16; 382/255, 275
See application file for complete search history.

(56) References Cited

U.S. PATENT DOCUMENTS 6,021,005 A    2/2000    Cathey, Jr. et al. .......... 359/737
6,069,738 A    5/2000    Cathey, Jr. et al. .......... 359/558
6,233,060 B1    5/2001    Shu et al. ..................... 358/1.9
6,241,656 B1    6/2001    Suga .......................... 600/109
6,525,302 B2    2/2003    Dowski, Jr. et al. ...... 250/201.2

(Continued)

FOREIGN PATENT DOCUMENTS

| JP | 2000-005127 | 1/2000 |
| JP | 2000005127 A | 1/2000 |
| JP | 2000-098301 | 4/2000 |
| JP | 2000-101845 | 4/2000 |
| JP | 2000098301 A | 4/2000 |

(Continued)

OTHER PUBLICATIONS

Edward R. Dowski, Jr. et al. "Wavefront Coding: jointly optimized optical and digital imaging system", CDM Optics, Inc and Army Research Laboratory, edd@cdm-optics.com, 2000.

(Continued)

*Primary Examiner*—Thanh X Luu
(74) *Attorney, Agent, or Firm*—Hogan Lovells US LLP

(57) ABSTRACT

An imaging apparatus able to design lenses without regard as to a zoom position or zoom amount and able to restore an image by high precision operation and a method of same, including an optical unit 110 including a plurality of optical systems 110-1 and 110-2 forming a first order image and having different magnifications, an imaging element 120, and an image processing device 150 forming the first order image to a high definition final image, wherein, in the image processing device 150, a kernel size used at the time of the convolution operation and the coefficients used in the operation of numerical values thereof are made variable in accordance with the magnification of the optical system, this is determined by input of an operation unit 190 etc., and the kernel size having suitability in accordance with the magnification of the optical system or the above coefficients are linked.

10 Claims, 12 Drawing Sheets

U.S. PATENT DOCUMENTS

| | | | |
|---|---|---|---|
| 6,642,504 B2 | 11/2003 | Cathey | 250/216 |
| 6,911,638 B2 * | 6/2005 | Dowski et al. | 250/201.9 |
| 2001/0028391 A1 | 10/2001 | Iko | 348/110 |
| 2003/0161049 A1 | 8/2003 | Okada et al. | 359/696 |

FOREIGN PATENT DOCUMENTS

| | | |
|---|---|---|
| JP | 2000101845 A | 4/2000 |
| JP | 2000-275582 | 10/2000 |
| JP | 2001-281554 | 10/2001 |
| JP | 2001281554 A | 10/2001 |
| JP | 2003-235794 | 8/2003 |
| JP | 2003-241078 | 8/2003 |
| JP | 2003235794 A | 8/2003 |

OTHER PUBLICATIONS

Edward R. Dowski, Jr. et al. Wavefront Coding: A modern method of achieving high performance and/or low cost imaging system:, CDM Optics, Inc., edd@cdm-optics.com, 1999.

Japanese language office action and its English language translation for corresponding Japanese application 2005217804 lists the references above, Jan. 12, 2010.

* cited by examiner

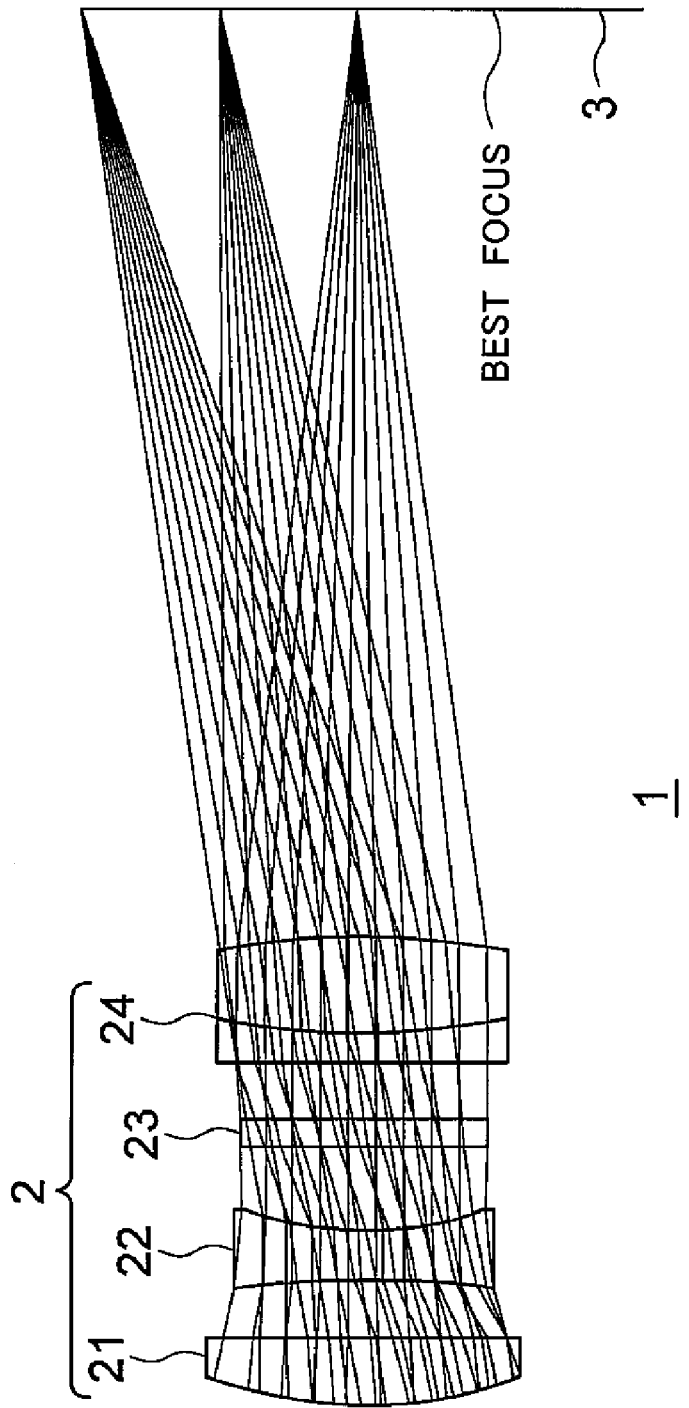

SPOT IMAGES OF OPTICAL SYSTEM OF FIG. 1

WIDE ANGLE SIDE

TELESCOPIC SIDE

FIG. 9

EXAMPLE OF KNEL. ROM

| M | ×1.5 | ×5 | ×10 |
|---|---|---|---|
| KDT | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

DEFOCUS = 0.2mm

BEST FOCUS

DEFOCUS = −0.2mm

IMAGING APPARATUS AND METHOD FOR GENERATING AN ABERRATION FREE IMAGE

TECHNICAL FIELD

The present invention relates to an imaging apparatus and imaging method which can be applied to a digital still camera, a camera mounted in a mobile phone, a camera mounted in a personal digital assistant, an image inspection system, an automatic control industrial camera, or the like using an imaging element and provided with a zoom optical system.

BACKGROUND ART

In recent years, rapid advances have been made in digitalization of information. This has led to remarkable efforts to meet with this in the imaging field.

In particular, as symbolized by the digital camera, in imaging surfaces, film is being taken over by use of solid-state imaging elements such as CCDs (Charge Coupled Devices) or CMOS (Complementary Metal Oxide Semiconductor) sensors in most cases.

An imaging lens device using a CCD or CMOS sensor for the imaging element in this way optically captures the image of an object by the optical system and extracts the image as an electric signal by the imaging element. Other than a digital still camera, this is used in a video camera, a digital video unit, a personal computer, a mobile phone, a personal digital assistant (PDA), and so on.

FIG. 1 is a diagram schematically showing the configuration of a general imaging lens device and a state of light beams.

This imaging lens device 1 has an optical system 2 and a CCD or CMOS sensor or other imaging element 3.

The optical system includes object side lenses 21 and 22, a stop 23, and an imaging lens 24 sequentially arranged from the object side (OBJS) toward the imaging element 3 side.

In the imaging lens device 1, as shown in FIG. 1, the best focus surface is made to match with the imaging element surface.

FIG. 2A to FIG. 2C show spot images on a light receiving surface of the imaging element 3 of the imaging lens device 1.

Further, imaging apparatuses using phase plates (wavefront coding optical elements) to regularly disperse the light beams, using digital processing to restore the image, and thereby enabling capture of an image having a deep depth of field and so on have been proposed (see for example Non-patent Documents 1 and 2 and Patent Documents 1 to 5).

Non-patent Document 1: "Wavefront Coding; jointly optimized optical and digital imaging systems", Edward R. Dowski, Jr., Robert H. Cormack, Scott D. Sarama.

Non-patent Document 2: "Wavefront Coding; A modern method of achieving high performance and/or low cost imaging systems", Edward R. Dowski, Jr., Gregory E. Johnson.

Patent Document 1: U.S. Pat. No. 6,021,005
Patent Document 2: U.S. Pat. No. 6,642,504
Patent Document 3: U.S. Pat. No. 6,525,302
Patent Document 4: U.S. Pat. No. 6,069,738
Patent Document 5: Japanese Patent Publication (A) No. 2003-235794

DISCLOSURE OF THE INVENTION

Problem to be Solved by the Invention

All of the imaging apparatuses proposed in the documents explained above are predicated on a PSF (Point-Spread-Function) being constant when inserting the above phase plate in the usual optical system. If the PSF changes, it is extremely difficult to realize an image having a deep depth of field by convolution using the subsequent kernels.

Accordingly, leaving aside the case of lenses with a single focal point, in lenses of a zoom system, AF system, etc., the high level of precision of the optical design and the accompanying increase in costs causes a major problem in adoption of this.

In other words, in a conventional imaging apparatus, suitable convolution processing is not possible. An optical design eliminating the astigmatism, coma aberration, zoom chromatic aberration, and other aberration causing deviation of the spot image at the time of the "wide" mode and at the time of the "tele" mode is required.

However, optical design eliminating these aberrations increases the difficulty of the optical design and induces problems such as an increase of the number of design processes, an increase of the costs, and an increase in size of the lenses.

Further, in for example an image inspection system, an automatic control device, or other optical systems, in order to check and control the image, it becomes necessary to perform focusing when switching the optical system, but due to the effects of variations in height of the measured objects itself, variations on placement of the measured objects, variations in transport units for transporting the measured objects, variations due to temperature, and so on, it is difficult to always achieve focus.

Accordingly, in an optical system provided with a plurality of optical systems, when applying technology for increasing the depth of the imaged field by the above-mentioned phase plate and signal processing after that, it is necessary to design the PSFs to have the same sizes and shapes in the optical systems. For this purpose, the difficulty of design increases. The high level of precision of lenses and the accompanying increase in costs cause a major problem in adoption of this.

An object of the present invention is to provide an imaging apparatus and imaging method able to restore a suitable image no matter which optical system is used in an imaging apparatus enabling interchange of a plurality of optical systems.

Means for Solving the Problem

An imaging apparatus according to a first aspect of the present invention is provided with an interchangeable plurality of lenses, an optical wavefront modulation element, an imaging element able to capture an object aberration image passing through at least one lens of the plurality of lenses and the optical wavefront modulation element, a conversion unit generating an aberration-free image signal from an object aberration image signal from the imaging element, and a conversion coefficient acquisition unit for acquiring a conversion coefficient in accordance with the one lens, wherein the conversion unit converts the image signal according to the conversion coefficient obtained from the conversion coefficient acquisition unit.

An imaging apparatus according to a second aspect of the present invention is provided with a plurality of optical systems including lenses and optical wavefront modulation elements, an imaging element able to capture an object aberration image, a switch control unit selectively making the object aberration image passing through at least one lens among the lenses and the optical wavefront modulation element in one optical system of the plurality of optical systems strike the imaging element, a conversion unit generating an aberration-free image signal from the object aberration image signal from the imaging element, and a conversion coefficient acquisition unit for acquiring the conversion coefficient in accordance with the one lens, wherein the conversion unit converts the image signal according to the conversion coefficient obtained from the conversion coefficient acquisition unit.

Preferably, the apparatus is further provided with a conversion coefficient storage unit storing conversion coefficients in accordance with the plurality of lenses, and the conversion coefficient acquisition unit acquires the conversion coefficient in accordance with the one lens from the conversion coefficient storage unit.

Preferably, the conversion coefficient acquisition unit acquires the conversion coefficient from the one lens attached to the imaging apparatus.

Preferably, the conversion coefficients include a plurality of coefficients in accordance with a distance up to the object, the conversion coefficient acquisition unit selects one coefficient from the plurality of coefficients according to information corresponding to the distance up to the object, and the conversion unit converts the image signal according to one coefficient selected by the conversion coefficient acquisition unit.

Preferably, the conversion coefficient includes a kernel size of the object aberration image as a variable.

Preferably, the plurality of optical systems are different in their magnifications.

An imaging method according to a third aspect of the present invention includes a step of capturing an object aberration image passing through at least one lens of the plurality of lenses and an optical wavefront modulation element by an imaging element, a step of acquiring a conversion coefficient in accordance with the one lens, and a step of generating an aberration-free image signal from the object aberration image signal from the imaging element according to the acquired conversion coefficient.

EFFECT OF THE INVENTION

According to the present invention, there is the advantage that suitable image restoration is possible even when the optical system is replaced.

BRIEF DESCRIPTION OF THE DRAWINGS

FIG. 1 is a diagram schematically showing the configuration of a general imaging lens device and a state of light beams.

FIG. 2A to FIG. 2C are diagrams showing spot images on a light receiving surface of an imaging element of the imaging lens device of FIG. 1, in which FIG. 2A is a diagram showing a spot image in a case where a focal point is deviated by 0.2 mm (defocus=0.2 mm), FIG. 2B is a diagram showing a spot image in a case of focus (best focus), and FIG. 2C is a diagram showing a spot image in a case where the focal point is deviated by −0.2 mm (defocus=−0.2 mm).

FIG. 9 is a diagram showing an example of storage data of a kernel data ROM.

FIG. 11A to FIG. 11C are diagrams showing spot images on the light receiving surface of an imaging element according to the present embodiment, in which FIG. 11A is a diagram showing a spot image in the case where the focal point is deviated by 0.2 mm (defocus=0.2 mm), FIG. 11B is a diagram showing a spot image in the case of focus (best focus), and FIG. 11C is a diagram showing a spot image in the case where the focal point is deviated by −0.2 mm (defocus=−0.2 mm).

FIG. 12A and FIG. 12B are diagrams for explaining an MTF of a first order image formed by the imaging element according to the present embodiment, in which FIG. 12A is a diagram showing a spot image on the light receiving surface of the imaging element of the imaging lens device, and FIG. 12B shows an MTF characteristic with respect to a spatial frequency.

DESCRIPTION OF NOTATIONS

100 . . . imaging apparatus, 110 . . . optical unit, 110-1, 110-2 . . . optical systems, 120 . . . imaging element, 130 . . . analog front end (AFE), 140 . . . optical system switch control unit, 150 . . . image processing device, 160 . . . camera signal processing unit, 190 . . . operation unit, 200 . . . system control device, 111 . . . object side lens, 112 . . . imaging lens, 113 . . . wavefront forming optical element, 113a . . . phase plate (optical wavefront modulation element), 152 . . . convolution processing unit, 153 . . . kernel data ROM, and 154 . . . convolution control unit.

BEST MODE FOR CARRYING OUT THE INVENTION

Below, embodiments of the present invention will be explained with reference to the accompanying drawings.

Figure 2A:
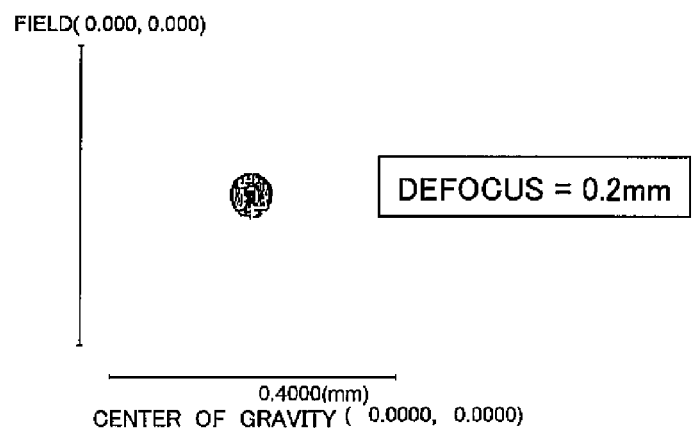
Figure 2B:
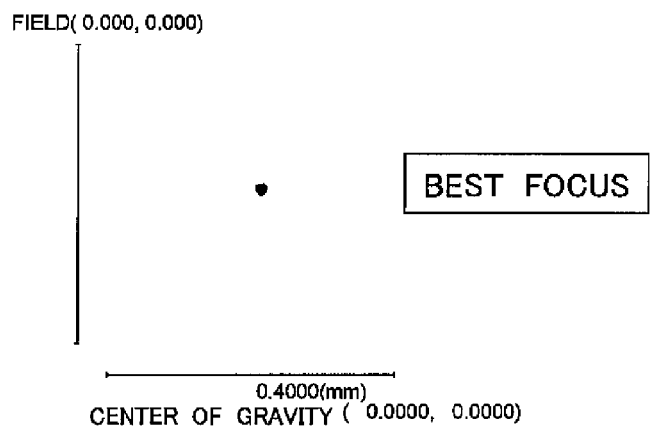
Figure 2C:
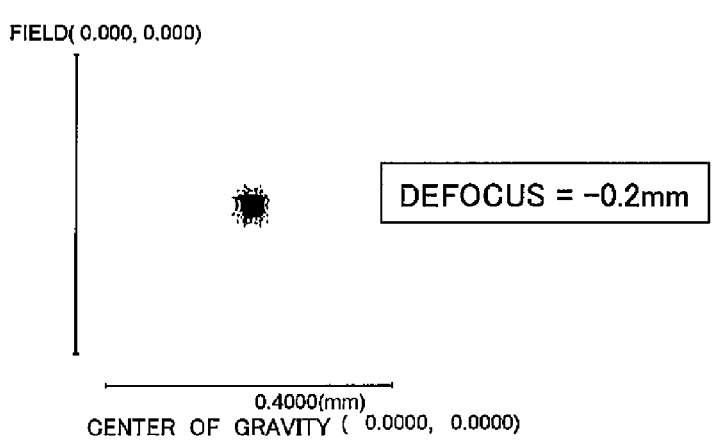
Figure 3:
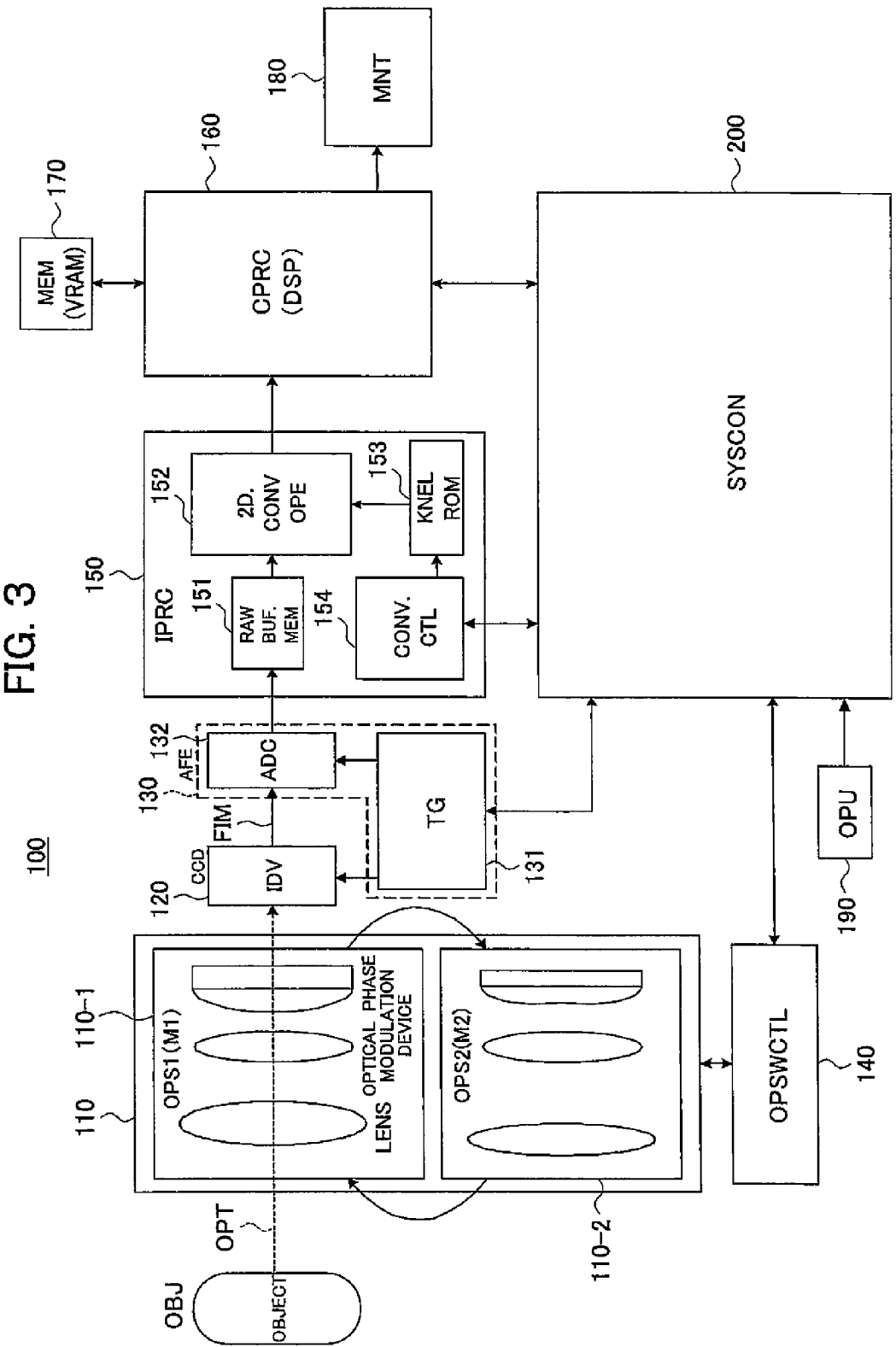
FIG. 3 is a block diagram showing the configuration of an embodiment of an imaging apparatus according to the present invention.

FIG. 3 is a block diagram showing the configuration of an embodiment of an imaging apparatus according to the present invention.

The imaging system 100 according to the present embodiment, as shown in FIG. 3, has an optical unit 110, imaging element (IDV) 120, analog front end (AFE) 130, optical system switch control unit (OPSWCNT) 140, image processing device (IPRC) 150, camera signal processing unit (CPRC) 160, image display memory (MEM) 170, image monitoring device (MNT) 180, operation unit (OPU) 190, and system control device (SYSCON) 200.

The optical unit 110 has a plurality of (in the present embodiment, two) optical systems 110-1 (OPS1) and 110-2 (OPS2) and sequentially supplies images capturing an object OBJ to the imaging element 120 in accordance with the switch processing of the optical system switch control unit 140.

The optical systems 110-1 and 110-2 have different optical magnifications and optically capture images of the imaging target object (object) OBJ. In the present embodiment, the optical magnification of the optical system 110-1 is set at M1, and the optical magnification of the optical system 110-2 is set at M2.

The imaging element 120 is formed by a CCD or CMOS sensor in which images captured at the optical systems 110-1 and 110-2 are imaged and which outputs an imaged first order image information as a first order image signal FIM of an electric signal via the analog front end 130 to the image processing device 150.

In FIG. 3, the imaging element 120 is described as a CCD as an example.

The analog front end 130 has a timing generator (TG) 131 and analog/digital (A/D) converter (ADC) 132.

The timing generator 131 generates a driving timing of a CCD of the imaging element 120, and the A/D converter 132 converts an analog signal input from the CCD to a digital signal and outputs the same to the image processing device 150.

The image processing device (two-dimensional convolution portion) 150 receives as input the digital signal of the captured image coming from the front stage AFE 130, applies two-dimensional convolution processing to this, and transfers the same to the later stage camera signal processing unit (DSP) 160.

The camera signal processing unit (DSP) 160 performs color interpolation, white balancing, YCbCr conversion processing, compression, filing, and other processing, stores images into the image display memory 170, displays images at the image monitoring device 180, and so on.

The system control device 200 has operation inputs such as the operation unit 190, determines the operation of the entire system in response to those inputs, controls the optical system switch control unit 140, AFE 130, image processing device 150, DSP 160, etc. and takes charge of arbitration control of the entire system.

Below, the configurations and functions of the optical system and image processing device of the present embodiment will be concretely explained.

Figure 4:
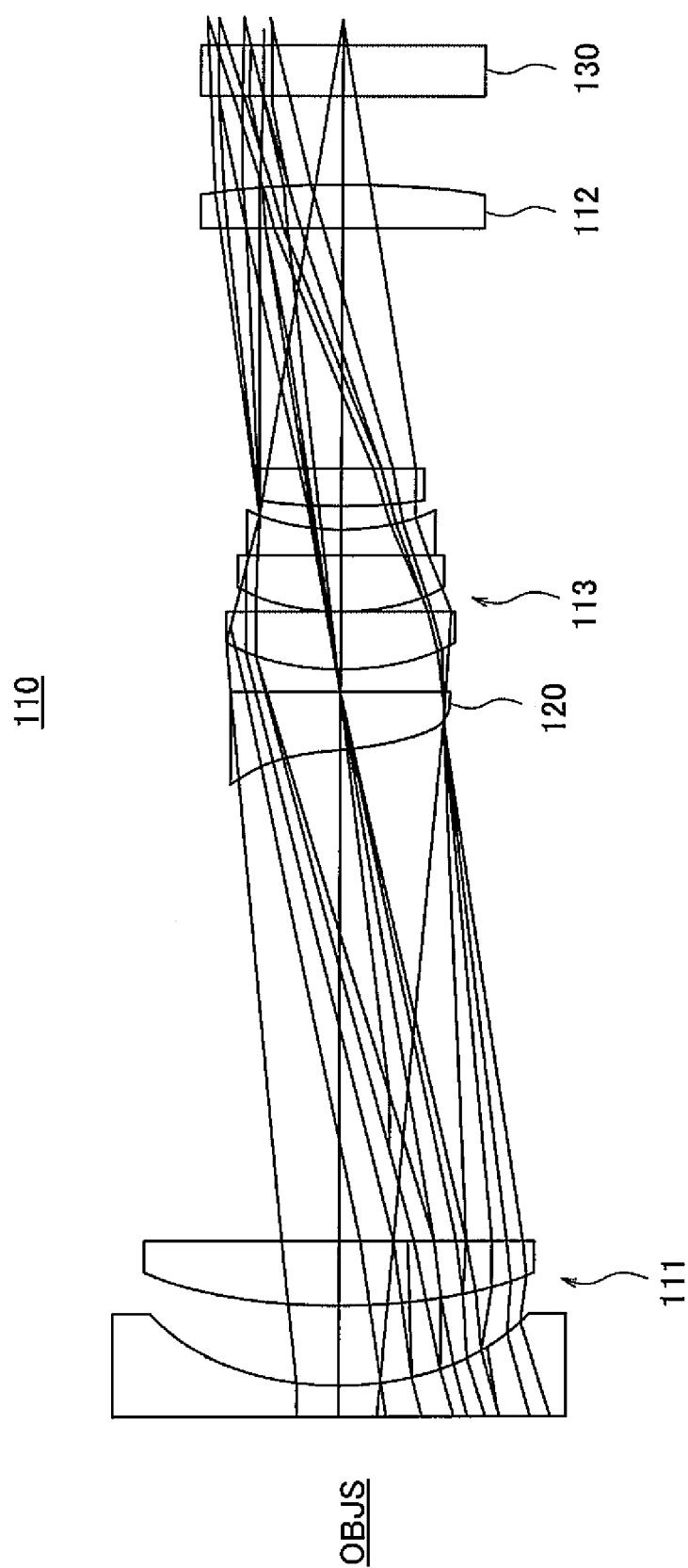
FIG. 4 is a diagram schematically showing an example of the configuration of a zoom optical system on a wide angle side of the imaging lens device according to the present embodiment.

FIG. 4 is a diagram schematically showing an example of the configuration of the zoom optical systems 110-1 and 110-2 according to the present embodiment. This diagram shows the wide angle side.

The zoom optical system 110 of FIG. 4 has an object side lens 111 arranged on the object side OBJS, an imaging lens 112 for forming an image in the imaging element 120, and an optical wavefront modulation element (wavefront coding optical element) group 113 arranged between the object side lens 111 and the imaging lens 112 and including a phase plate (cubic phase plate) deforming the wavefront of the image formed on the light receiving surface of the imaging element 120 by the imaging lens 112 and having for example a three-dimensional curved surface. Further, a not shown stop is arranged between the object side lens 111 and the imaging lens 112.

Note that, in the present embodiment, an explanation was given of the case where a phase plate was used, but the optical wavefront modulation elements of the present invention may include any elements so far as they deform the wavefront. They may include optical elements changing in thickness (for example, the above-explained third order phase plate), optical elements changing in refractive index (for example, a refractive index distribution type wavefront modulation lens), optical elements changing in thickness and refractive index by coding on the lens surface (for example, a wavefront coding hybrid lens), liquid crystal devices able to modulate the phase distribution of the light (for example, liquid crystal spatial phase modulation devices), and other optical wavefront modulation elements.

The zoom optical system 110 of FIG. 4 is an example of inserting an optical phase plate 113a into a 3× zoom system used in a digital camera.

The phase plate 113a shown in the figure is an optical lens regularly dispersing the light beams converged by the optical system. By inserting this phase plate 113a, an image not focused anywhere on the imaging element 120 is realized.

In other words, the phase plate 113a forms light beams having a deep depth (playing a central role in the image formation) and a flare (blurred portion).

A system for restoring this regularly dispersed image to a focused image by digital processing will be referred to as a "wavefront aberration control optical system (wavefront coding optical system (WFCO))". This processing is carried out in the image processing device 150.

Here, the basic principle of the WFCO will be explained.

Figure 5:
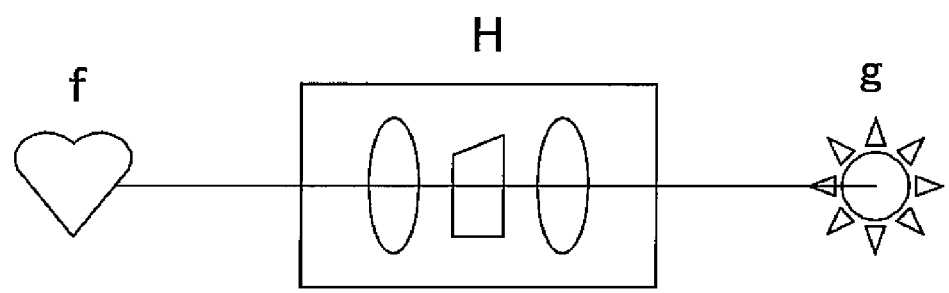
FIG. 5 is a diagram for explaining a principle of WFCO.

As shown in FIG. 5, an image f of the object enters into the WFCO optical system H, whereby a g image is generated.

This is represented by the following equation.

$$g = H * f \qquad \text{(Equation 1)}$$

where, * indicates convolution.

In order to find the object from the generated image, the next processing is required.

$$f = H^{-1} * g \qquad \text{(Equation 2)}$$

Here, the kernel size and operational coefficients concerning H will be explained.

Assume that the zoom positions are Zpn, Zpn−1, . . . . Further, assume that the individual H functions are Hn, Hn−1, . . . .

The spots are different, therefore the H functions become as follows.

$$Hn = \begin{pmatrix} a & b & c \\ d & e & f \end{pmatrix} \qquad \text{[Equation 3]}$$

$$Hn-1 = \begin{pmatrix} a' & b' & c' \\ d' & e' & f' \\ g' & h' & i' \end{pmatrix}$$

The difference of the number of rows and/or the number of columns of this matrix is referred to as the "kernel size". Each figure is used as an operational coefficient.

Here, each H function may be stored in the memory, or PSF may be defined as a function of an object distance, and the setting may be enabled so that the optimum filter is formed with respect to any object distance by calculation according to the object distance and calculating the H function. Further, the H function may be defined as a function of the object distance, and the H function may be directly found according to the object distance.

Figure 6:
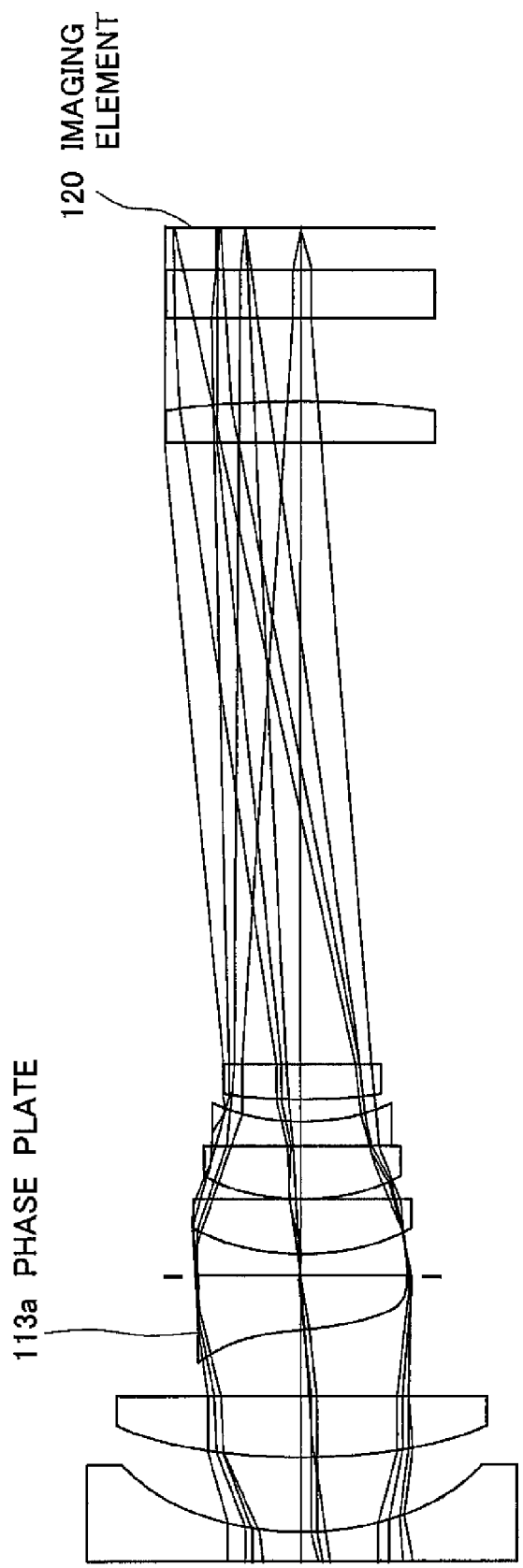
FIG. 6 is a diagram schematically showing an example of the configuration of a zoom optical system on a telescopic side of the imaging lens device according to the present embodiment.
Figure 7:
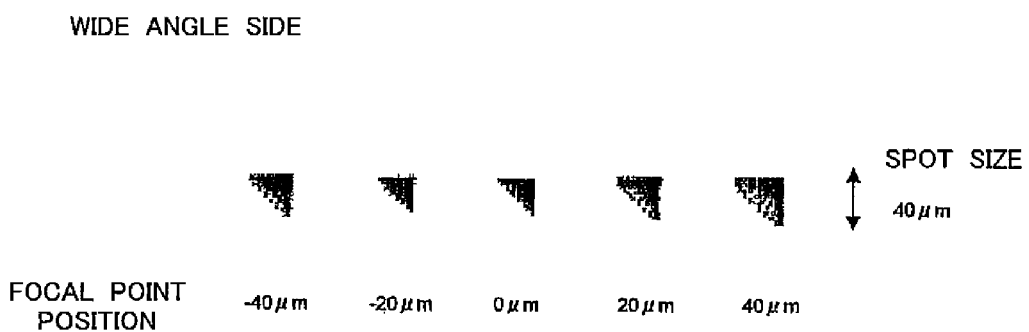
FIG. 7 is a diagram showing a spot shape at the center of an image height on the wide angle side.
Figure 8:
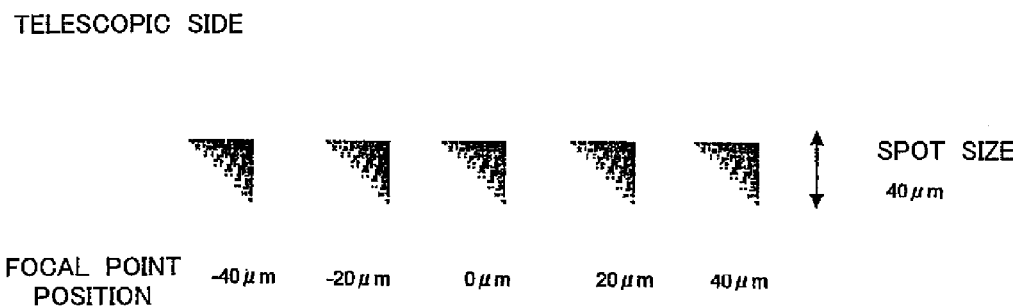
FIG. 8 is a diagram showing a spot shape at the center of an image height on the telescopic side

However, the spot shape of the light passing through an optical system inserting a phase plate in a telescopic lens having an image angle of about 20 degrees as shown in FIG. 6, as shown in FIG. 7 and FIG. 8, differs between a wide angle side and a telescopic side thereof. Here, the spot shape is a simple display method of PSF. A difference of the spot shape means that the PSF differs. In an optical system having such a spot image differing according to the switching of the optical magnification of the optical system, the H of FIG. 5 differs.

Suitable convolution processing cannot be performed in a general imaging apparatus. Therefore, an optical design eliminating astigmatism, coma aberration, zoom chromatic aberration, and other aberration causing deviation of this spot image was required. However, an optical design for eliminating these aberrations increases the difficulty of the optical design and causes the problems of an increase of the number of design processes, an increase of the costs, and an increase in size of the lenses.

Therefore, in the present embodiment, as shown in FIG. 3, the apparatus is configured so that images from optical systems 110-1 and 110-2 having different magnifications are received at the imaging element 120 and input to the image processing device 150, conversion coefficients in accordance with optical systems are acquired, and a dispersion-free image signal is generated from a dispersed image signal from the imaging element 120 with the acquired conversion coefficients.

This optical system shown in FIG. 3 becomes a system which is mainly useful in an image inspection system, automatic control industrial camera, and so on and can switch the optical magnification by switching not zoom lenses, but the optical systems themselves so that for example objects having a variety of dimensions can be inspected.

Note that, in the present embodiment, "dispersion" means the phenomenon where, as explained above, inserting the phase plate 113a causes the formation of an image not focused anywhere on the imaging element 120 and the formation of light beams having a deep depth (playing a central role in the image formation) and flare (blurred portion) by the phase plate 113a and includes the same meaning as aberration because of the behavior of the image being dispersed and forming a blurred portion. Accordingly, in the present embodiment, there also exists a case where dispersion is explained as aberration.

Next, an explanation will be given of the configuration and processing of the image processing device 150.

The image processing device (IPRC) 150, as shown in FIG. 3, has a raw buffer memory (BUF MEM) 151, two-dimensional convolution processing unit (2D CONV OPE) 152, kernel data storage ROM (KNEL ROM) 153 as a storing means, and convolution control unit (CONV CTL) 154.

The convolution control unit 154 performs control of the ON/OFF state of the convolution processing, screen size, replacement of the kernel data, and so on and is controlled by the system control device 200.

Further, the kernel data storage ROM 153, as shown in FIG. 9, stores kernel data KDT for convolution calculated by PSFs of optical systems which are prepared in advance. The optical system information to be used is acquired from the optical system switch control unit 140 at the time of setting the optical system by the system control device 200. The kernel data is selected and controlled through the convolution control unit 154.

In the example of FIG. 9, kernel data KDT-A becomes data corresponding to an optical magnification M(×1.5), kernel data KDT-B becomes data corresponding to an optical magnification M(×5), and kernel data KDT-C becomes data corresponding to an optical magnification M(×10).

Figure 10:
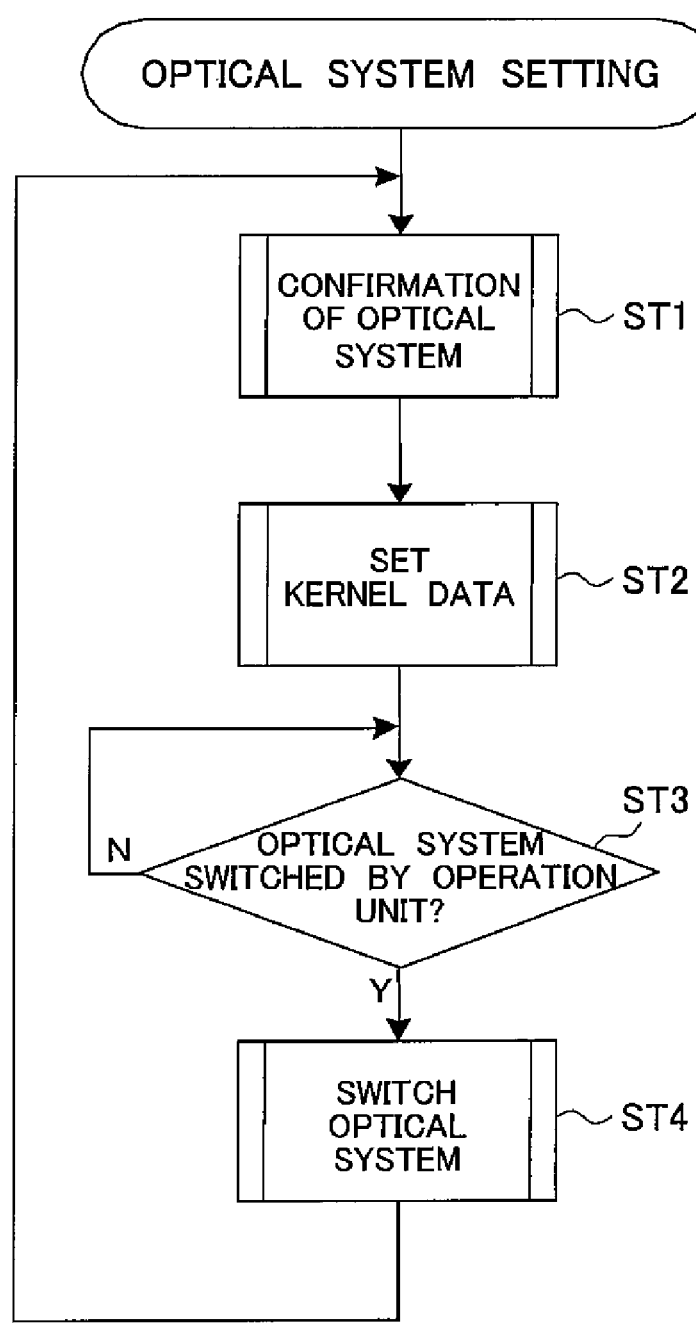
FIG. 10 is a flow chart showing an outline of optical setting processing of a system control device.

FIG. 10 is a flow chart showing an outline of the optical system setting processing of the system control device 200.

First, the optical system is confirmed (ST1), and the kernel data KDT is set (ST2).

When a switching instruction of the optical system is given by operation of the operation unit 190 (ST3), the optical system switch control unit 140 switches the output of the optical system of the optical unit 110, and the processing of step ST1 is carried out (ST4).

Note that the optical systems of FIG. 4 and FIG. 6 are examples. The present invention is not always used for the optical systems of FIG. 4 and FIG. 6. Further, for the spot shape as well, FIG. 7 and FIG. 8 are examples. The spot shape of the present embodiment is not limited to those shown in FIG. 7 and FIG. 8.

Further, the kernel data storage ROM of FIG. 9 is not always used for optical magnifications and the sizes and values of the kernels. Further, the number of prepared kernel data KDT is not limited to three.

Note that, as explained above, in the case of an imaging apparatus provided with a phase plate (wavefront coding optical element) as an optical wavefront modulation element, if within a predetermined focal distance range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

In the present embodiment, WFCO is employed, and it is possible to obtain a high definition image quality. In addition, the optical system can be simplified, and the cost can be reduced.

Below, these characteristic features will be explained.

Figure 11A:
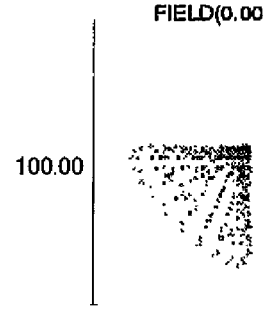
Figure 11B:
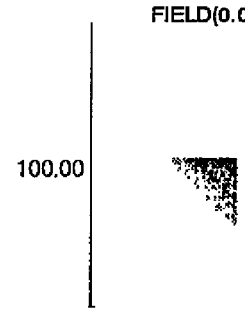
Figure 11C:
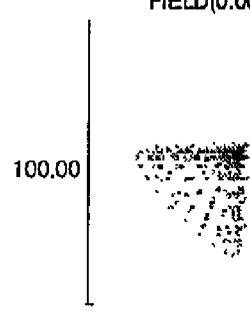

FIG. 11A to FIG. 11C show spot images on the light reception surface of the imaging element 120.

FIG. 11A is a diagram showing a spot image in the case where the focal point is deviated by 0.2 mm (defocus=0.2 mm), FIG. 11B is a diagram showing a spot image in the case of focus (best focus), and FIG. 11C is a diagram showing a spot image in the case where the focal point is deviated by −0.2 mm (defocus=−0.2 mm).

As seen also from FIG. 11A to FIG. 11C, in the imaging apparatus 100 according to the present embodiment, light beams having a deep depth (playing a central role in the image formation) and a flare (blurred portion) are formed by the wavefront forming optical element group 113 including the phase plate 113a.

In this way, the first order image FIM formed in the imaging apparatus 100 of the present embodiment is given light beam conditions resulting in deep depth.

Figure 12A:
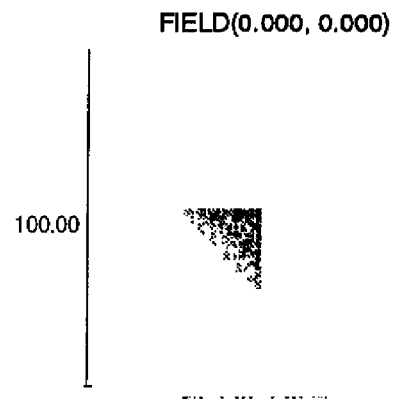
Figure 12B:
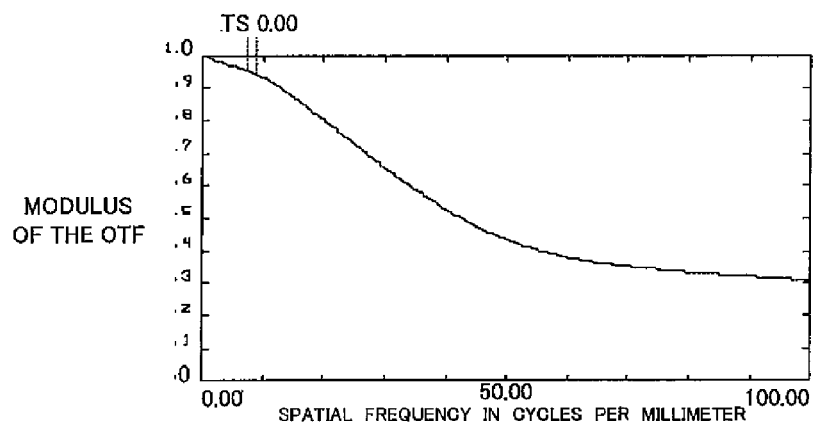

FIG. 12A and FIG. 12B are diagrams for explaining a modulation transfer function (MTF) of the first order image formed by the imaging lens device according to the present embodiment, in which FIG. 12A is a diagram showing a spot image on the light receiving surface of the imaging element of the imaging lens device, and FIG. 123 shows the MTF characteristic with respect to the spatial frequency Sfreq.

In the present embodiment, the high definition final image is left to the correction processing of the latter stage image processing device 150 configured by, for example, a digital signal processor. Therefore, as shown in FIG. 12A and FIG. 12B, the MTF of the first order image essentially becomes a low value.

The image processing device 150, as explained above, receives the first order image FIM from the imaging element 120, applies predetermined correction processing etc. for boosting the MTF at the spatial frequency Sfreq of the first order image, and forms a high definition final image FNLIM.

Figure 13:
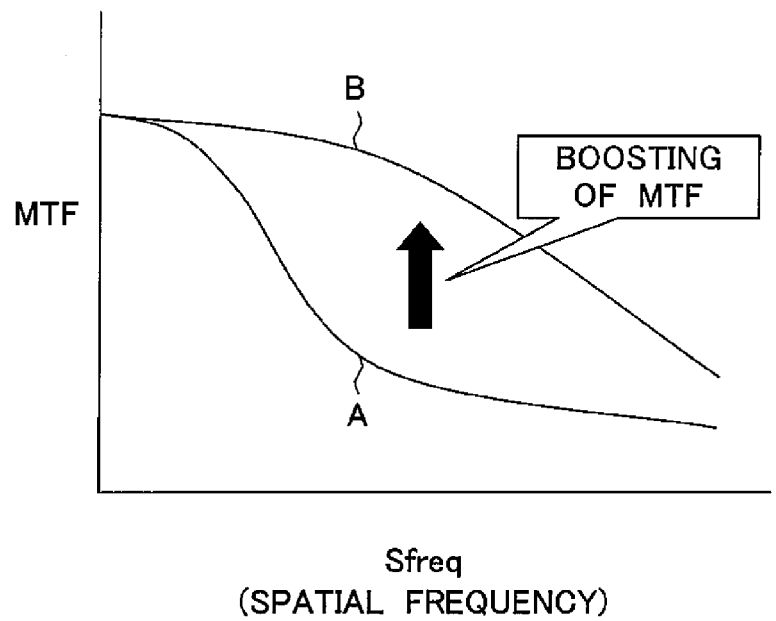
FIG. 13 is a diagram for explaining MTF correction processing in an image processing device according to the present embodiment.

The MTF correction processing of the image processing device 150 performs correction so that, for example as indicated by a curve A of FIG. 13, the MTF of the first order image which essentially becomes a low value approaches (reaches) the characteristic indicated by a curve B in FIG. 13 by post-processing such as edge enhancement and chroma enhancement by using the spatial frequency Sfreq as a parameter.

The characteristic indicated by the curve B in FIG. 13 is the characteristic obtained in the case where the wavefront forming optical element is not used and the wavefront is not deformed as in for example the present embodiment.

Note that all corrections in the present embodiment are according to the parameter of the spatial frequency Sfreq.

In the present embodiment, as shown in FIG. 13, in order to achieve the MTF characteristic curve B desired to be finally realized with respect to the MTF characteristic curve A for the optically obtained spatial frequency Sfreq, the strength of the edge enhancement etc. is adjusted for each spatial frequency Sfreq to correct the original image (first order image).

Figure 14:
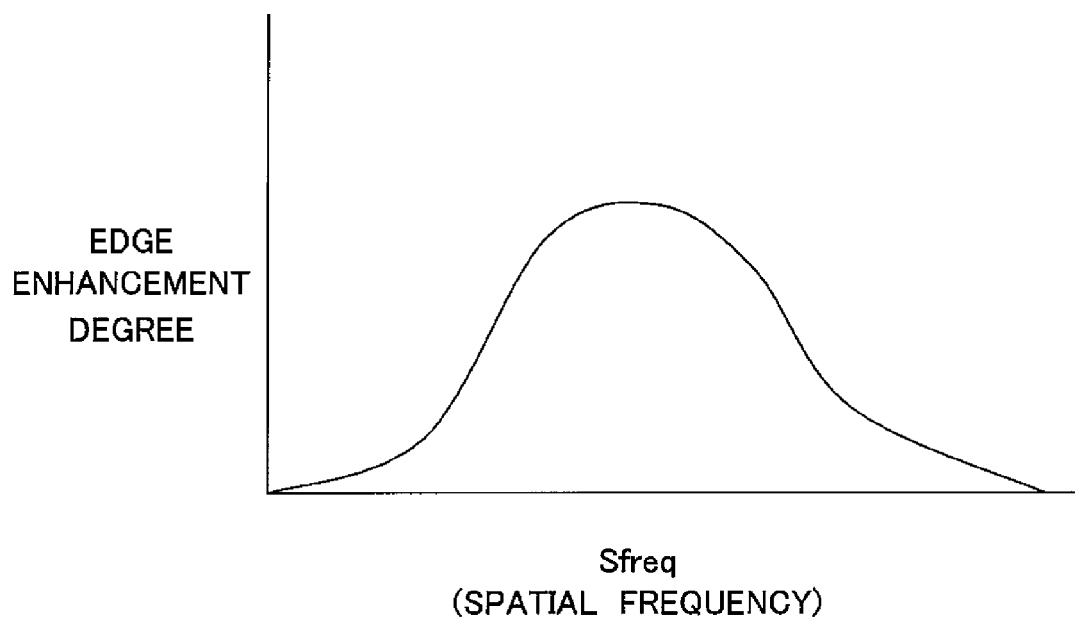
FIG. 14 is a diagram for concretely explaining the MTF correction processing in an image processing device according to the present embodiment.

For example, in the case of the MTF characteristic of FIG. 13, the curve of the edge enhancement degree with respect to the spatial frequency Sfreq becomes as shown in FIG. 14.

Namely, by performing the correction by weakening the edge enhancement on the low frequency side and high frequency side within a predetermined bandwidth of the spatial frequency Sfreq and strengthening the edge enhancement in an intermediate frequency zone, the desired MTF characteristic curve B is virtually realized.

In this way, the imaging apparatus 100 according to the embodiment is an image forming system basically having an optical unit 110 including a plurality of optical systems 110-1 and 110-2 forming a first order image and having different magnifications and an imaging element 120 and an image processing device 150 for forming the first order image to a high definition final image, wherein the optical system is newly provided with a wavefront forming optical element or is provided with a glass, plastic, or other optical element with a surface shaped for wavefront forming use so as to deform the wavefront of the image formed, such a wavefront is imaged onto the imaging surface (light receiving surface) of the imaging element 120 formed by a CCD or CMOS sensor, and the imaged first order image is passed through the image processing device 150 to obtain the high definition image.

In the present embodiment, the first order image from the imaging element 120 is given light beam conditions with very deep depth. For this reason, the MTF of the first order image inherently becomes a low value, and the MTF thereof is corrected by the image processing device 150.

Here, the process of image formation in the imaging apparatus 100 of the present embodiment will be considered in terms of wave optics.

A spherical wave scattered from one point of an object point becomes a converged wave after passing through the imaging optical system. At that time, when the imaging optical system is not an ideal optical system, aberration occurs. The wavefront becomes not spherical, but a complex shape. Geometric optics and wave optics are bridged by wavefront optics. This is convenient in the case where a wavefront phenomenon is handled.

When handling a wave optical MTF on an imaging plane, the wavefront information at an exit pupil position of the imaging optical system becomes important.

The MTF is calculated by a Fourier transform of the wave optical intensity distribution at the imaging point. The wave optical intensity distribution is obtained by squaring the wave optical amplitude distribution. That wave optical amplitude distribution is found from a Fourier transform of a pupil function at the exit pupil.

Further, the pupil function is the wavefront information (wavefront aberration) at the exit pupil position, therefore if the wavefront aberration can be strictly calculated as a numerical value through the optical systems 110-1 and 110-2, the MTF can be calculated.

Accordingly, if processing the wavefront information at the exit pupil position by a predetermined technique, the MTF value on the imaging plane can be freely changed.

In the present embodiment as well, the shape of the wavefront is mainly changed by a wavefront forming optical element. It is truly the phase (length of light path along the rays) that is increased or decreased to form the desired wavefront.

Then, when forming the target wavefront, the light beams from the exit pupil are formed by a dense ray portion and a sparse ray portion as seen from the geometric optical spot images shown in FIG. 11A to FIG. 11C.

The MTF of this state of light beams exhibits a low value at a position where the spatial frequency Sfreq is low and somehow maintains the resolution up to the position where the spatial frequency Sfreq is high.

Namely, if this low MTF value (or, geometric optically, the state of the spot image), the phenomenon of aliasing will not be caused.

That is, a low pass filter is not necessary.

Further, the flare-like image causing a drop in the MTF value may be eliminated by the image processing device 150 configured by the later stage DSP etc. Due to this, the MTF value is remarkably improved.

As explained above, according to the present embodiment, the apparatus includes the optical unit 110 including a plurality of optical systems 110-1 and 110-2 forming the first order image and having different magnifications, the imaging element 120, and the image processing device 150 for forming the first order image to the high definition final image. In the image processing device 150, by making the kernel size used at the time of the convolution operation and the coefficients used in the operation of numerical values thereof variable in accordance with the magnification of the optical system, determining this by the input of the operation unit 190 etc., and linking the kernel size having suitability in accordance with the magnification of the optical system or the above coefficients, there are the advantages that the lenses can be designed without regard as to the magnification and defocus range and the image can be restored by high precision convolution.

Further, there is the advantage that a natural image, for example, an image focused with respect to the object desired to be captured, but blurred in the background can be obtained without requiring an optical lens having a high difficulty, high expense, and large size and without driving a lens.

Further, the imaging apparatus 100 according to the present embodiment can be used for the WFCO of a zoom lens designed considering small size, light weight, and cost in a digital camera, camcorder, or other consumer electronic device.

Further, in the present embodiment, since the apparatus has the imaging lens system having the wavefront forming optical element for deforming the wavefront of the image formed on the light receiving surface of the imaging element 120 by the imaging lens 112 and the image processing device 150 for receiving the first order image FIM by the imaging element 120 and applying predetermined correction processing etc. to boost the MTF at the spatial frequency of the first order image and form the high definition final image FNLIM, there is the advantage that the acquisition of a high definition image quality becomes possible.

Further, the configurations of the optical systems 110-1 and 110-2 can be simplified, production becomes easy, and the cost can be reduced.

When using a CCD or CMOS sensor as the imaging element, there is a resolution limit determined from the pixel pitch. When the resolution of the optical system is over that limit resolution power, the phenomenon of aliasing is generated and exerts an adverse influence upon the final image. This is a known fact.

For the improvement of the image quality, desirably the contrast is raised as much as possible, but this requires a high performance lens system.

However, as explained above, when using a CCD or CMOS sensor as the imaging element, aliasing occurs.

At present, in order to avoid the occurrence of aliasing, the imaging lens system jointly uses a low pass filter made of a uniaxial crystalline system to thereby avoid the phenomenon of aliasing.

The joint usage of a low pass filter in this way is correct in terms of principle, but a low pass filter per se is made of crystal, therefore is expensive and hard to handle. Further, there is the disadvantage that the optical system is more complicated due to the use in the optical system.

As described above, a higher definition image quality is demanded as a trend of the times. In order to form a high definition image, the optical system in a general imaging lens device must be made more complicated. If it is complicated, production becomes difficult. Also, the utilization of the expensive low pass filters leads to an increase in the cost.

However, according to the present embodiment, the occurrence of the phenomenon of aliasing can be avoided without using a low pass filter, and a high definition image quality can be obtained.

Further, according to the embodiment of the interchangeable lens type as shown in FIG. 3, even in a case where the system is switched to a different optical system, suitable convolution processing can be carried out, suitable image restoration can be realized, and as a result, where the system is used in for example an image inspection system, more suitably focused images can be obtained even where there are variations of dimensions of measured objects themselves, variations of disposing positions of measured objects, and other variations.

Note that, in the present embodiment, the example of arranging the wavefront forming optical element of the optical system on the object side from the stop was shown, but functional effects the same as those described above can be obtained even by arranging the wavefront forming optical element at a position the same as the position of the stop or on the imaging lens side from the stop.

Further, the optical systems of FIG. 4 and FIG. 6 are examples. The present invention is not always used for the optical systems of FIG. 4 and FIG. 6. Further, for the spot shape as well, FIG. 7 and FIG. 8 are examples. The spot shape of the present embodiment is not limited to those shown in FIG. 7 and FIG. 8.

Further, the kernel data storage ROM of FIG. 9 is not always used for optical magnifications and sizes and values of kernels. Further, the number of prepared kernel data KDT is not limited to three.

INDUSTRIAL APPLICABILITY

In an imaging apparatus and imaging method of the present invention, lenses can be designed without regard as to the zoom position or zoom amount, and the image can be restored by high precision operation. Therefore, they can be applied to a digital still camera, a camera mounted in a mobile phone, a camera mounted in a personal digital assistant, an image inspection system, an automatic control industrial camera, and so on provided with zoom optical systems.

The invention claimed is:

1. An imaging apparatus comprising
an interchangeable plurality of lenses,
an optical wavefront modulation element,
an imaging element able to capture an object aberration image passing through at least one lens of the plurality of lenses and the optical wavefront modulation element,
a conversion unit generating an aberration-free image signal from an object aberration image signal from the imaging element, and
a conversion coefficient acquisition unit acquiring a conversion coefficient in accordance with the one lens, wherein the conversion coefficient includes a kernel size of the object aberration image as a variable,
wherein the conversion unit converts the image signal according to the conversion coefficient obtained from the conversion coefficient acquisition unit.

2. An imaging apparatus as set forth in claim 1, wherein the apparatus further comprises a conversion coefficient storage unit storing conversion coefficients in accordance with the plurality of lenses, and
the conversion coefficient acquisition unit acquires the conversion coefficient in accordance with the one lens from the conversion coefficient storage unit.

3. An imaging apparatus as set forth in claim 1, wherein the conversion coefficient acquisition unit acquires the conversion coefficient from the one lens attached to the imaging apparatus.

4. An imaging apparatus as set forth in claim 1, wherein the conversion coefficients include a plurality of coefficients in accordance with a distance up to the object,
the conversion coefficient acquisition unit selects one coefficient from the plurality of coefficients according to information corresponding to the distance up to the object, and
the conversion unit converts the image signal according to one coefficient selected by the conversion coefficient acquisition unit.

5. An imaging apparatus comprising
a plurality of optical systems including lenses and optical wavefront modulation elements,
an imaging element able to capture an object aberration image,
a switch control unit selectively making the object aberration image passing through at least one lens among the lenses and the optical wavefront modulation element in one optical system of the plurality of optical systems strike the imaging element,
a conversion unit generating an aberration-free image signal from the object aberration image signal from the imaging element, and
a conversion coefficient acquisition unit acquiring a conversion coefficient in accordance with the one lens, wherein the conversion coefficient includes a kernel size of the object aberration image as a variable,
wherein the conversion unit converts the image signal according to the conversion coefficient obtained from the conversion coefficient acquisition unit.

6. An imaging apparatus as set forth in claim 5, wherein the apparatus further comprises a conversion coefficient storage unit for storing conversion coefficients in accordance with the plurality of lenses, and the conversion coefficient acquisition unit acquires the conversion coefficient in accordance with the one lens from the conversion coefficient storage unit.

7. An imaging apparatus as set forth in claim 5, wherein the conversion coefficient acquisition unit acquires the conversion coefficient from the one lens attached to the imaging apparatus.

8. An imaging apparatus as set forth in claim 5, wherein the conversion coefficients include a plurality of coefficients in accordance with a distance up to the object, the conversion coefficient acquisition unit selects one coefficient from the plurality of coefficients according to information corresponding to the distance up to the object, and the conversion unit converts the image signal according to one coefficient selected by the conversion coefficient acquisition unit.

9. An imaging apparatus as set forth in claim 5, wherein the plurality of optical systems are different in their magnifications.

10. An imaging method including a step of capturing an object aberration image passing through at least one lens of the plurality of lenses and an optical wavefront modulation element by an imaging element, a step of acquiring a conversion coefficient in accordance with the one lens, wherein the conversion coefficient includes a kernel size of the object aberration image as a variable, and a step of generating an aberration-free image signal from the object aberration image signal from the imaging element according to the acquired conversion coefficient.

* * * * *